(12) United States Patent
Rivera

(10) Patent No.: US 8,794,125 B1
(45) Date of Patent: Aug. 5, 2014

(54) METHOD AND APPARATUS FOR CAPTURING A RIMMED SINGLE SERVING CUP IN AN ADAPTER

(76) Inventor: Adrian Rivera, Whittier, CA (US)

(*) Notice: Subject to any disclaimer, the term of this patent is extended or adjusted under 35 U.S.C. 154(b) by 291 days.

(21) Appl. No.: 13/235,367

(22) Filed: Sep. 17, 2011

Related U.S. Application Data

(63) Continuation of application No. 11/392,972, filed on Mar. 28, 2006, now Pat. No. 7,685,931, and a continuation-in-part of application No. 11/392,893, filed on Mar. 28, 2006, and a continuation-in-part of application No. 12/960,496, filed on Dec. 4, 2010, and a continuation-in-part of application No. 12/762,262, filed on Apr. 16, 2010, and a continuation-in-part of application No. 12/620,584, filed on Nov. 17, 2009, now Pat. No. 8,291,812, and a continuation-in-part of application No. 12/610,181, filed on Oct. 30, 2009, now Pat. No. 8,621,981, and a continuation-in-part of application No. 11/777,831, filed on Jul. 13, 2007.

(51) Int. Cl.
*A47J 31/06* (2006.01)

(52) U.S. Cl.
USPC ............................................................ 99/295

(58) Field of Classification Search
USPC ............. 99/322, 323, 386; 210/493.5, 497.01
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenbert et al. |
| 3,405,630 A | 10/1968 | Weber, III |
| 3,583,308 A | 6/1971 | Williams |
| 3,607,297 A | 9/1971 | Fasano |
| 3,757,670 A | 9/1973 | Laama et al. |
| 3,844,206 A | 10/1974 | Weber |
| 3,958,502 A | 5/1976 | Vitous |
| 4,253,385 A | 3/1981 | Illy |
| 4,286,515 A | 9/1981 | Baumann et al. |
| 4,603,621 A | 8/1986 | Roberts |
| 4,703,687 A | 11/1987 | Wei |
| 4,800,089 A | 1/1989 | Scott |
| 4,998,463 A | 3/1991 | Precht et al. |

(Continued)

FOREIGN PATENT DOCUMENTS

WO WO 2005/092160 A1 3/2005

*Primary Examiner* — Dana Ross
*Assistant Examiner* — Renee L Miller
(74) *Attorney, Agent, or Firm* — Kenneth L. Green

(57) ABSTRACT

A single serving filter paper cup for making a brewed beverage. The filter paper cup includes a receptacle having a rim captured between an adapter base and lid. The receptacle is formed by pleats in a receptacle wall and the rim around the top of the receptacle wall. Preferably, a heat seal filter paper is used and the pleats are adhered by the heat to retain shape. The receptacle is inserted into an adapter and brewing material is placed into the receptacle. The cover is folded over the rim and an adapter lid is attached to the adapter. The adapter lid and body sandwich the cover and receptacle rim to hold the filter paper cup against the lid to pack the brewing material against the lid and facilitate injection of hot water into the brewing material.

22 Claims, 10 Drawing Sheets

(56) References Cited

U.S. PATENT DOCUMENTS

| | | |
|---|---|---|
| 5,000,082 A | 3/1991 | Lassota |
| 5,012,629 A | 5/1991 | Rehman |
| 5,046,409 A | 9/1991 | Henn |
| 5,123,335 A | 6/1992 | Aselu |
| 5,233,914 A | 8/1993 | English |
| 5,325,765 A * | 7/1994 | Sylvan et al. .................. 99/295 |
| 5,335,589 A | 8/1994 | Yerves et al. |
| 5,526,733 A | 6/1996 | Klawuhn et al. |
| 5,582,730 A | 12/1996 | Hugentobler |
| 5,636,563 A | 6/1997 | Oppermann et al. |
| 5,649,412 A | 7/1997 | Binacchi |
| 5,676,041 A | 10/1997 | Glucksman et al. |
| 5,829,340 A | 11/1998 | Yang |
| 5,840,189 A | 11/1998 | Sylvan et al. |
| 5,870,943 A | 2/1999 | Levi et al. |
| 5,895,672 A | 4/1999 | Cooper |
| 6,079,315 A * | 6/2000 | Beaulieu et al. ............ 99/289 R |
| 6,136,352 A | 10/2000 | Silverstein et al. |
| 6,189,438 B1 | 2/2001 | Bielfeldt et al. |
| 6,202,542 B1 * | 3/2001 | Melton ............................ 99/322 |
| 6,606,938 B2 | 8/2003 | Taylor |
| 6,655,260 B2 | 12/2003 | Lazaris et al. |
| 6,708,600 B2 | 3/2004 | Winkler et al. |
| 6,727,484 B2 | 4/2004 | Policappelli |
| 6,740,345 B2 | 5/2004 | Cai |
| 6,777,007 B2 | 8/2004 | Cai |
| 6,832,542 B2 | 12/2004 | Hu et al. |
| 6,843,165 B2 | 1/2005 | Stoner et al. |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,131,369 B2 | 11/2006 | Gantt et al. |
| 7,320,274 B2 | 1/2008 | Castellani |
| 7,377,089 B2 | 5/2008 | Rapparini |
| 7,946,217 B2 | 5/2011 | Favre et al. |
| 8,047,127 B2 | 11/2011 | Lin |
| 2002/0035929 A1 | 3/2002 | Kanba et al. |
| 2002/0148356 A1 | 10/2002 | Lazaris et al. |
| 2003/0200872 A1 | 10/2003 | Lin |
| 2004/0005384 A1 | 1/2004 | Cai |
| 2004/0118290 A1 | 6/2004 | Cai |
| 2005/0236323 A1 | 10/2005 | Oliver et al. |
| 2005/0257695 A1 | 11/2005 | Dobranski et al. |
| 2006/0159815 A1 | 7/2006 | Crook et al. |
| 2006/0196364 A1 | 9/2006 | Kirschner |
| 2009/0229471 A1 | 9/2009 | Lun et al. |
| 2010/0083843 A1 | 4/2010 | Denisart et al. |
| 2011/0274802 A1 | 11/2011 | Rivera |
| 2012/0207895 A1 | 8/2012 | Rivera |
| 2012/0207896 A1 | 8/2012 | Rivera |
| 2012/0276264 A1 | 11/2012 | Rivera |

\* cited by examiner

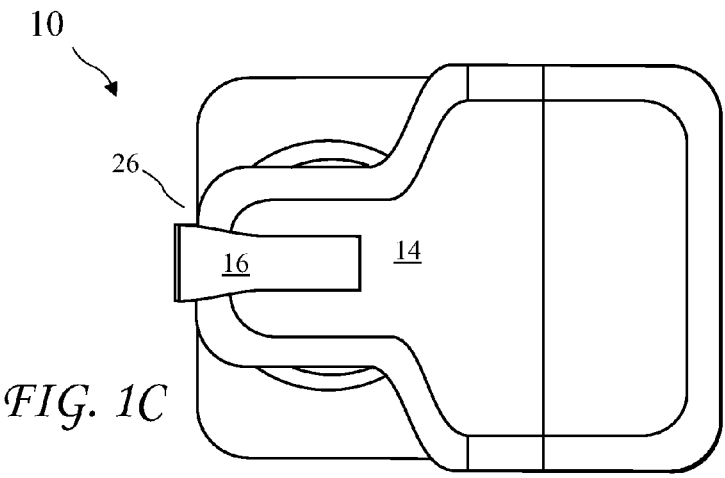
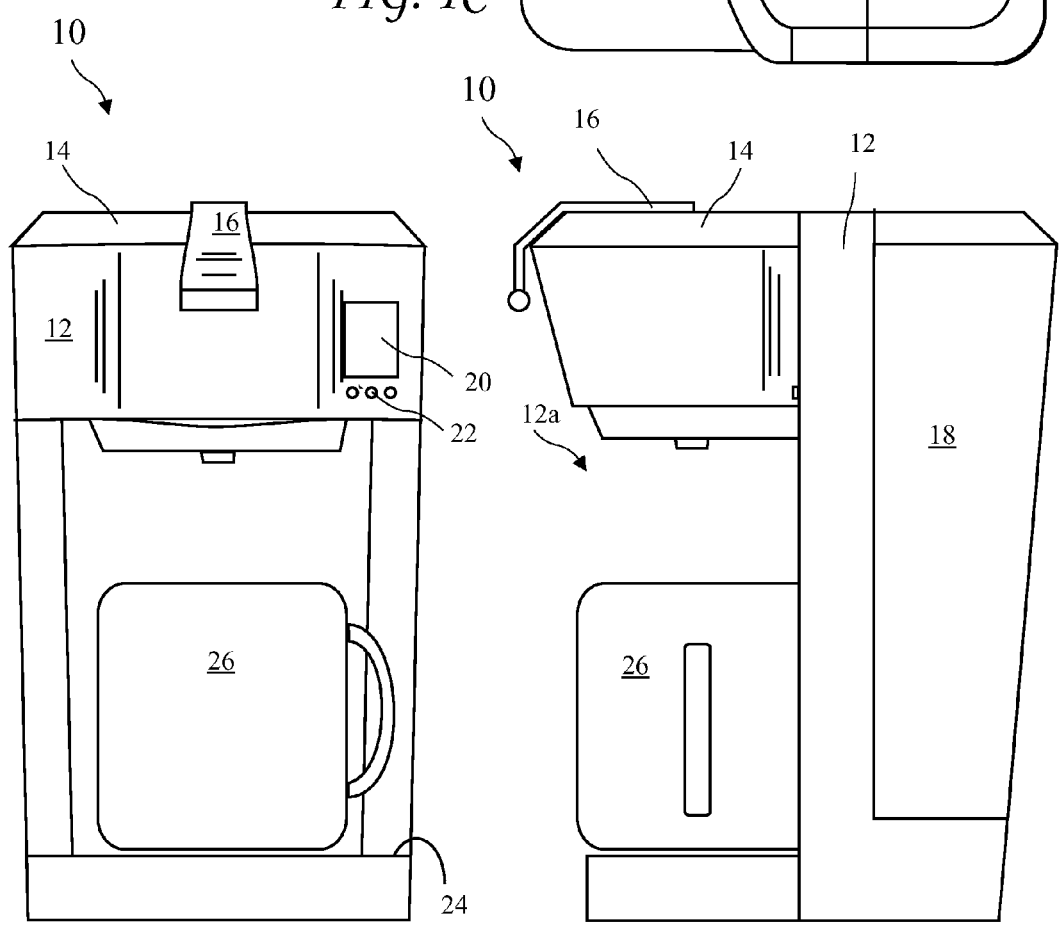
FIG. 1C
FIG. 1A
FIG. 1B

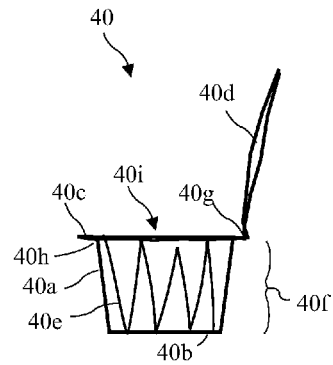
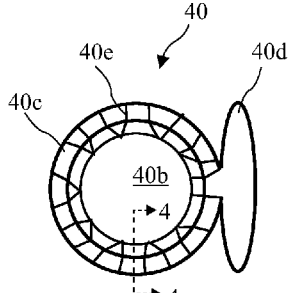
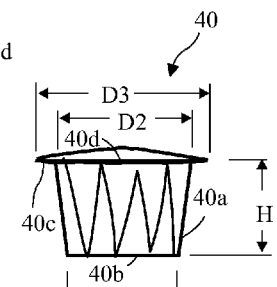
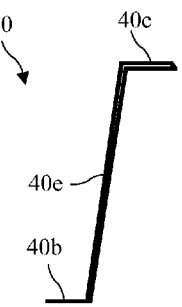
FIG. 3A    FIG. 3B    FIG. 3C    FIG. 4
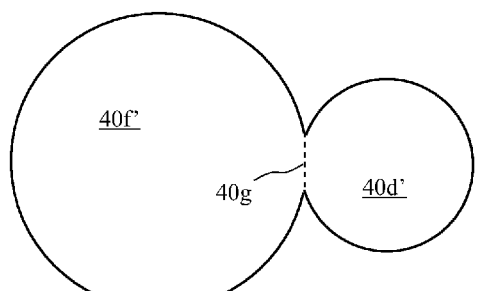
FIG. 3D
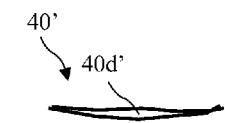
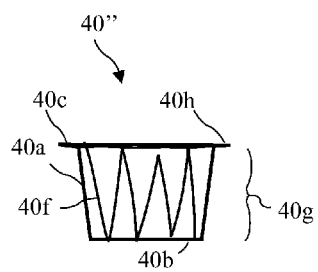
FIG. 5A    FIG. 5B

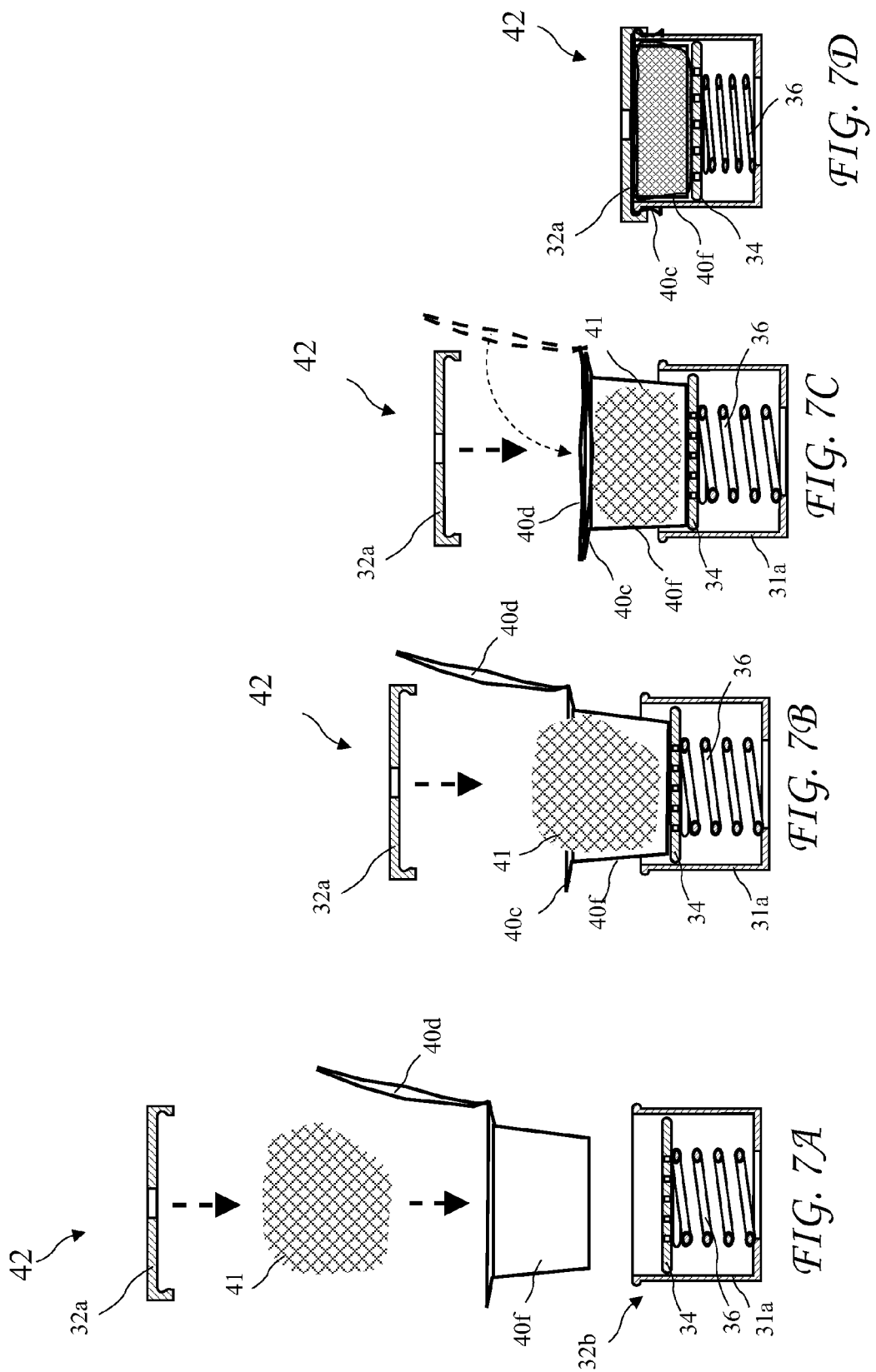

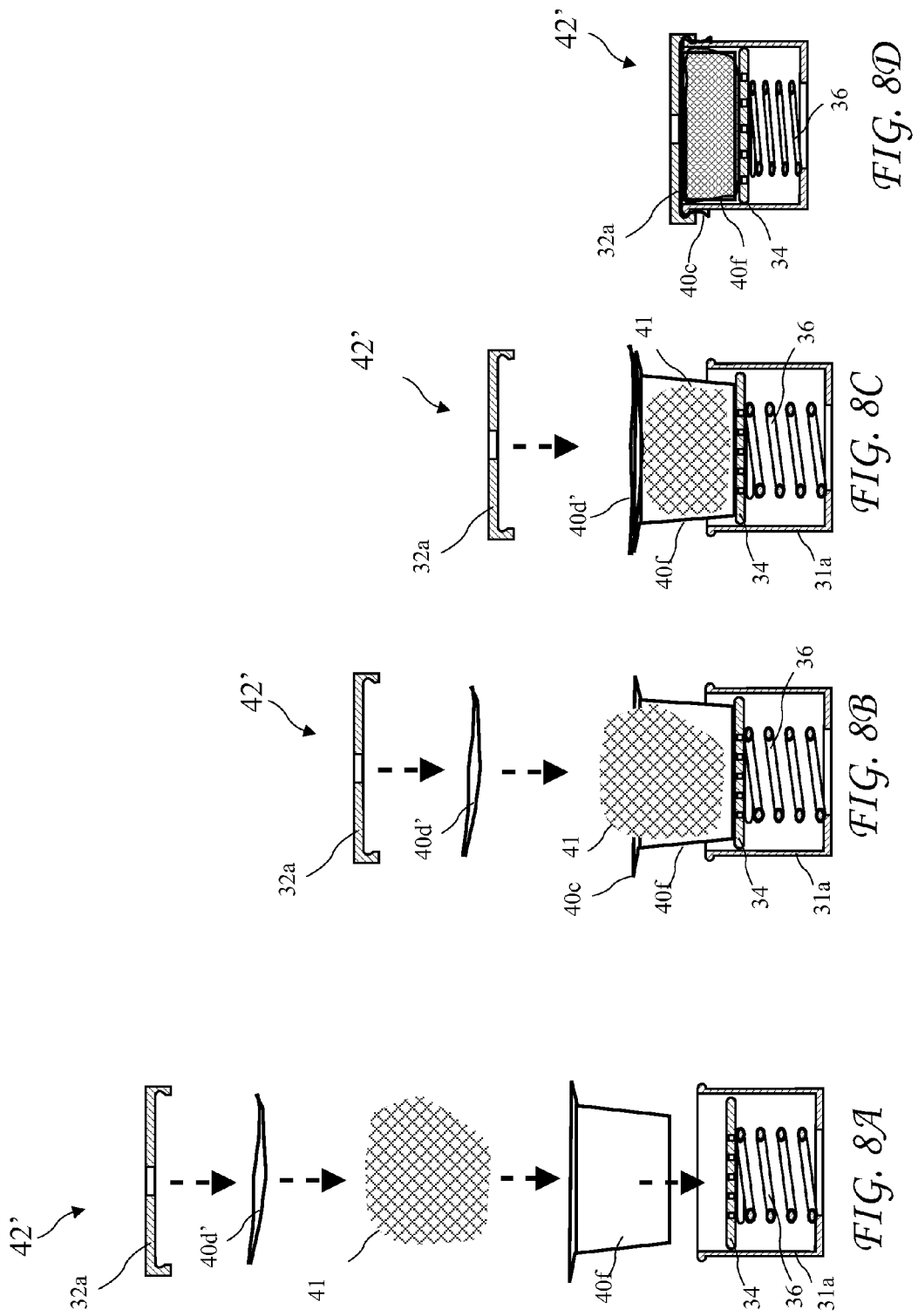

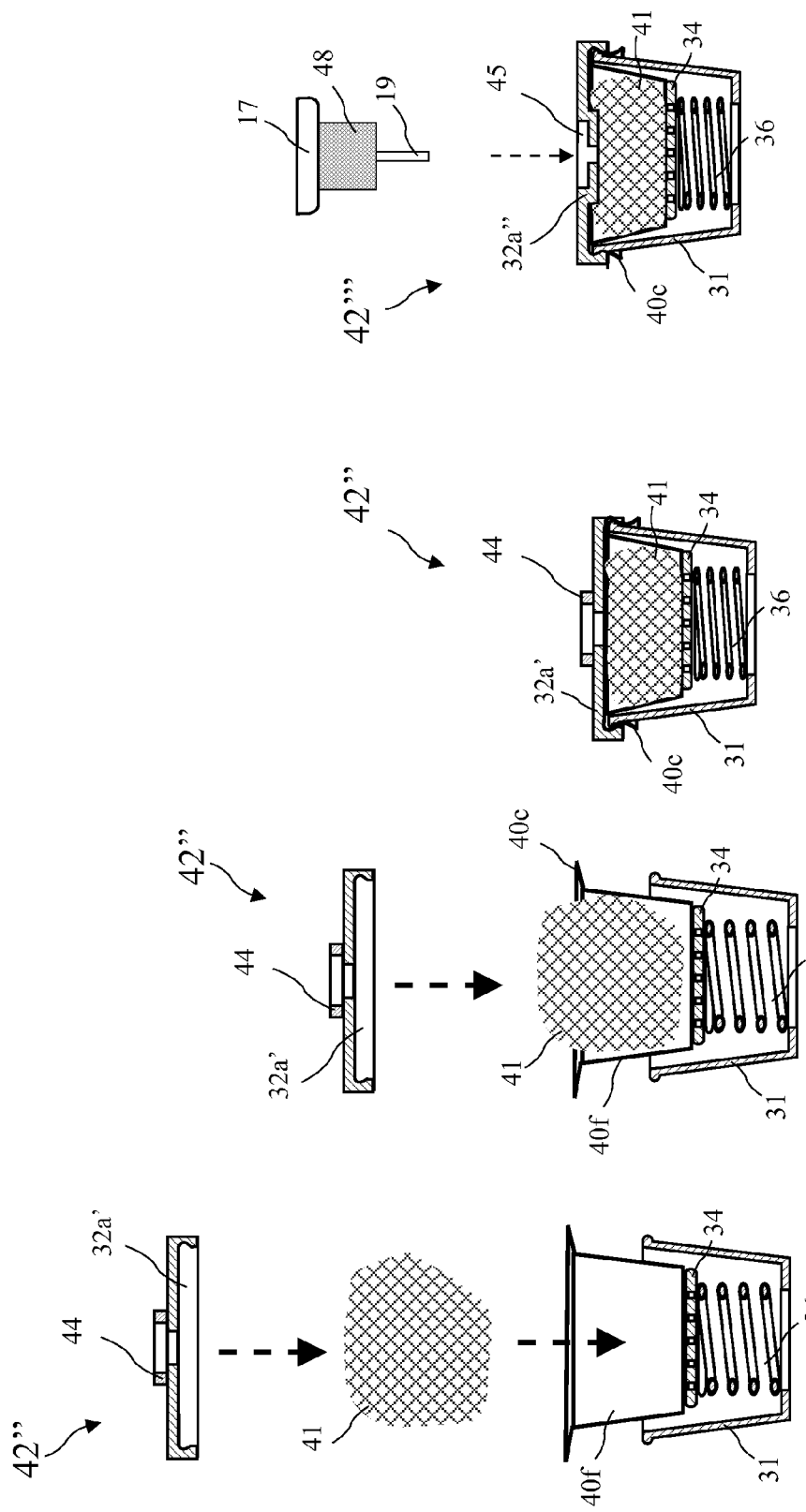

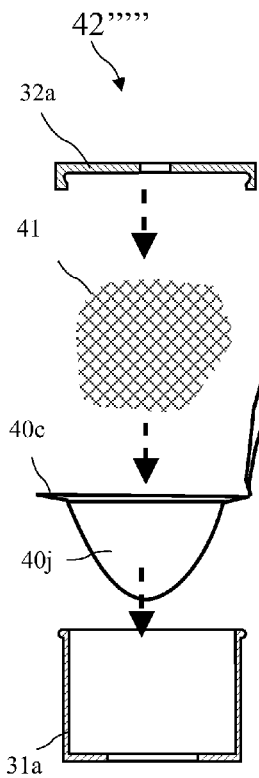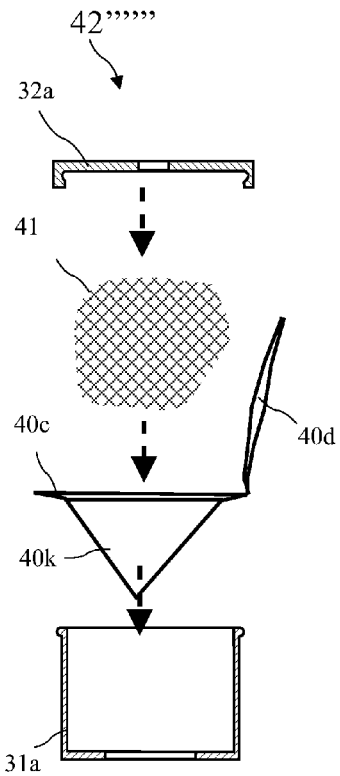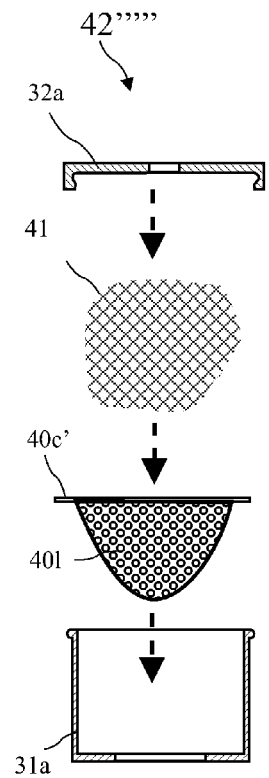
FIG. 13A    FIG. 14A    FIG. 15A
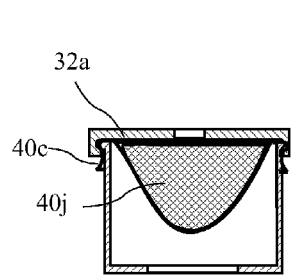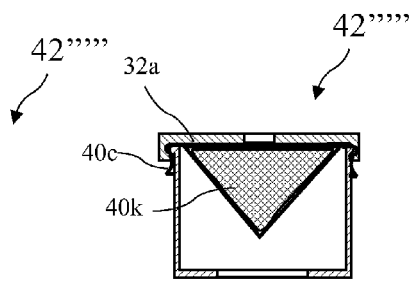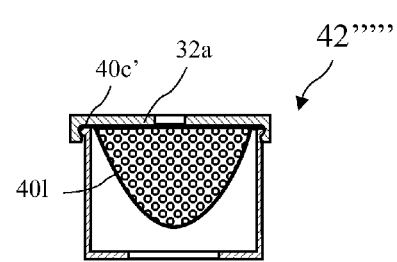
FIG. 13B    FIG. 14B    FIG. 15B

METHOD AND APPARATUS FOR CAPTURING A RIMMED SINGLE SERVING CUP IN AN ADAPTER

The present application claims the priority of:
U.S. Provisional Patent Application Ser. No. 60/594,972 filed May 23, 2005, and is a Continuation In Part of:
U.S. patent application Ser. No. 11/392,972 filed Mar. 28, 2006 now U.S. Pat. No. 7,685,931; and
U.S. patent application Ser. No. 11/392,893 filed Mar. 28, 2006; and
U.S. patent application Ser. No. 11/777,831 filed Jul. 13, 2007; and
U.S. patent application Ser. No. 12/610,181 filed Oct. 30, 2009 now U.S. Pat. No. 8,621,981; and
U.S. patent application Ser. No. 12/620,584 filed Nov. 17, 2009 now U.S. Pat. No. 8,291,812; and
U.S. patent application Ser. No. 12/762,262 filed Apr. 16, 2010; and
U.S. patent application Ser. No. 12/960,496 filed Dec. 4, 2010,
which applications are incorporated in their entirety herein by reference.

BACKGROUND OF THE INVENTION

The present invention relates to brewing coffee and in particular to a single serving filter paper cup having a rim captured between an adapter base and lid.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 11/777,831 filed Jul. 13, 2007 for "Pod Adapter System for Single Service Beverage Brewers" by the present applicant overcomes this problem using pre-packaged coffee in closed filter paper commonly called a pod, and inserting the closed pod into a pod holder including a tamping spring and bottom tamper for tamping the pod between the bottom tamper and a pod holder lid. While the pod adapter of the '831 application works well for coffee pods, it does not always hold the pod uniformly and/or firmly against the adapter lid. In some instances the pod is folded creating channeling of heated water which avoids the brewing material in the pod holder, and in other instances a needle for injecting water into the pod fails to puncture the pod.

BRIEF SUMMARY OF THE INVENTION

The present invention addresses the above and other needs by providing a single serving filter paper cup for making a brewed beverage. The filter paper cup includes a receptacle having a rim captured between an adapter base and lid. The receptacle is formed by pleats in a receptacle wall and the rim around the top of the receptacle wall. Preferably, a heat seal filter paper is used and the pleats are adhered by the heat to retain shape. The receptacle is inserted into an adapter and brewing material is placed into the receptacle. The cover is folded over the rim and an adapter lid is attached to the adapter. The adapter lid and body sandwich the cover and receptacle rim to hold the filter paper cup against the lid to pack the brewing material against the lid and facilitate injection of hot water into the brewing material.

In accordance with one aspect of the present invention, there is provided a single serving filter paper cup. The filter paper cup includes a concave receptacle and a flat cover. The receptacle comprises a downward concave cup having pleated walls and shaped to receive and hold brewing material and includes a pleated annular rim circling the downward concave cup. The flat cover is hingedly attached to the annular rim and is configured to cover the upper opening and overlap the annular rim of the receptacle. The receptacle and the cover are made of water permeable material cut as a smaller diameter first portion for forming the flat cover and a larger diameter second portion for forming the receptacle. Forming the downward concave cup of the receptacle from the larger diameter second portion creates the folds in the downward concave cup and in the annular rim. The cover may also be a detached cover and the receptacle may be used without a cover.

In accordance with another aspect of the present invention, there is provided a single serving filter paper cup having a receptacle and cover which are sandwiched by cooperation of an adapter lid to an adapter body to facilitate puncturing the cover for injecting heated water into the single serving filter paper cup. The brewing material is retained in the pod solely by attaching the adapter lid to the adapter body to sandwich the annular rim of the receptacle and the outer edge of the cover between the adapter lid and body.

In accordance with yet another aspect of the present invention, there is provided a single serving filter paper cup having a receptacle and cover which are sandwiched by cooperation of an adapter lid to an adapter body, and tamped against the adapter lid by a tamping spring and bottom tamper to firmly push brewing material in the single serving filter paper cup against the adapter lid to prevent or reduce channeling of heated water injected into the single serving filter paper cup.

In accordance with another aspect of the invention, there is provided a method of manufacturing a package assembly and constructing a single serving filter paper cup. The method includes the steps of: providing water permeable material; forming substantially circular lower and upper portions hingedly connected to each other from the water permeable material; shaping the lower portion to form a downward concave cup shaped receptacle to receive and hold a brewing material; forming an annular rim surrounding the top of the concave cup shape of the receptacle; defining a hinge wherein the upper portion is configured to fold along the hinge over the lower portion and onto the annular rim to provide a cover for the receptacle to form a single serving filter paper cup; and providing the single serving filter paper cup to an individual user.

In accordance with still another aspect of the invention, there is provided a method for preparing a brewed drink using the single filter paper cup including the steps of: obtaining an adapter; positioning the single serving filter paper cup receptacle in an adapter base of the adapter; positioning the annular rim on a top edge of the adapter base; filling the single serving filter paper cup receptacle with the brewing material; folding the single serving filter paper cup cover over the single serving filter paper cup receptacle; and attaching an adapter lid of the adapter to the adapter base to sandwich the annular rim of the single serving filter paper cup receptacle and the outer edge of the single serving filter paper cup cover between the adapter lid to the adapter base. The adapter lid and the adapter base sandwich the annular rim of the single serving filter paper cup receptacle and the outer edge of the single serving filter paper cup cover to hold the cover taut to facilitate puncturing the single serving filter paper cup cover for injecting heated water into the single serving filter paper cup. Cooperation of features of the outer edge of the adapter lid and features of the adapter base is preferably the sole method of retaining the brewing material in the single serving filter paper cup.

In accordance with yet another aspect of the invention, the single serving filter paper cup comprises a receptacle and a detached cover. After the single serving filter paper cup receptacle is positioned in the adapter base and filled with brewing material, the detached single serving filter paper cup cover is positioned over the single serving filter paper cup receptacle and the adapter lid is attached to the adapter body thereby sandwiching the annular rim of the single serving filter paper cup receptacle and the outer edge of the detached single serving filter paper cup cover to hold the cover taut to facilitate puncturing the single serving filter paper cup cover for injecting heated water into the single serving filter paper cup.

In accordance with still another aspect of the invention, the single serving filter paper cup receptacle is constructed from filter paper, but the single serving filter paper cup cover may be constructed from filter paper, plastic, wax paper, or any material suitable for puncturing by needle attached to the coffee maker. The cover may be attached by, for example, adhesive, to the receptacle, or may be a detached cover.

In accordance with another aspect of the invention, the single serving filter paper cup consist of the single serving filter paper cup receptacle used without a cover. The annular rim of the single serving filter paper cup receptacle is captured between the adapter lid and the adapter body to hold the single serving filter paper cup receptacle in place. The adapter lid may further include a seal on a top surface to seal with the coffee maker.

In accordance with yet another aspect of the invention, the single serving filter paper cup material is a tampable material. The single serving filter paper cup receptacle is made of filter paper material and tamping apparatus in the adapter base or the coffee maker may easily urge the single serving filter paper cup receptacle towards the adapter lid to tamp coffee residing in the single serving filter paper cup receptacle to tamp the coffee.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3A shows a side view of the single serving filter paper cup according to the present with an attached cover.

FIG. 3B shows a top view of the single serving filter paper cup with an attached cover according to the present invention.

FIG. 3C shows a second side view of the single serving filter paper cup with the attached cover closed.

FIG. 3D shows filter paper cut to form the single serving filter paper cup.

FIG. 4 is a cross-sectional view of the single serving filter paper cup taken along line 4-4 of FIG. 3B showing folds according to the present.

FIG. 5A shows a single serving filter paper cup receptacle and a detached cover.

FIG. 5B shows a single serving filter paper cup used without a cover.

FIG. 7A is a cross-sectional side view of a single serving brewing capsule, taken along line 30'-30' of FIG. 2, showing a portion of coffee above the single serving filter paper cup and the adapter body, and the adapter lid above the portion of coffee, according to the present invention.

FIG. 7B is a cross-sectional side view of the single serving brewing capsule, taken along line 30'-30' of FIG. 2, showing the portion of coffee in the single serving filter paper cup receptacle resting in the adapter base, and the adapter lid above the portion of coffee, according to the present invention.

FIG. 7C is a cross-sectional side view of the single serving brewing capsule, taken along line 30'-30' of FIG. 2, showing the portion of coffee in the single serving filter paper cup receptacle, the attached cover folded over the portion of coffee, and the adapter lid above the attached cover, according to the present invention.

FIG. 7D is a cross-sectional side view of the single serving brewing capsule, taken along line 30'-30' of FIG. 2, showing the portion of coffee in the single serving filter paper cup in the adapter body, and the rim of the single serving filter paper cup receptacle and outer edge of the single serving filter paper cup cover sandwiched between the adapter lid and adapter body, according to the present invention.

FIG. 8A is a cross-sectional side view of a single serving brewing capsule, taken along line 30'-30' of FIG. 2, showing the portion of coffee above the single serving filter paper cup receptacle and the adapter body, the detached cover above the portion of coffee, and the adapter lid above the detached cover, according to the present invention.

FIG. 8B is a cross-sectional side view of the single serving brewing capsule, taken along line 30'-30' of FIG. 2, showing the portion of coffee in the single serving filter paper cup receptacle, the detached cover above the portion of coffee, and the adapter lid above the detached cover, according to the present invention.

FIG. 8C is a cross-sectional side view of the single serving brewing capsule, taken along line 30'-30' of FIG. 2, showing the portion of coffee in the single serving filter paper cup receptacle, the detached cover resting on the portion of coffee and the single serving filter paper cup receptacle, and the adapter lid above the single serving filter paper cup, according to the present invention.

FIG. 8D is a cross-sectional side view of the single serving brewing capsule, taken along line 30'-30' of FIG. 2, showing the portion of coffee in the single serving filter paper cup in the adapter body, and the rim of the single serving filter paper cup receptacle and outer edge of the single serving filter paper cup cover sandwiched between the adapter lid and adapter body, according to the present invention.

FIG. 9A is a cross-sectional side view of a single serving brewing capsule, taken along line 30'-30' of FIG. 2, showing the portion of coffee above the single serving filter paper cup receptacle and the adapter body, and the adapter lid including a seal above the portion of coffee, according to the present invention.

FIG. 9B is a cross-sectional side view of the single serving brewing capsule, taken along line 30'-30' of FIG. 2, showing the portion of coffee in the single serving filter paper cup receptacle, and the adapter lid including the seal above the portion of coffee, according to the present invention.

FIG. 9C is a cross-sectional side view of the single serving brewing capsule, taken along line 30'-30' of FIG. 2, showing the portion of coffee in the single serving filter paper cup receptacle in the adapter body, and the rim of the single serving filter paper cup receptacle sandwiched between the adapter lid and adapter body, according to the present invention.

FIG. 9D is a cross-sectional side view of the single serving brewing capsule, taken along line 30'-30' of FIG. 2, showing the portion of coffee in the single serving filter paper cup receptacle in the adapter body, and the rim of the single serving filter paper cup receptacle sandwiched between the adapter lid including a recessed area and adapter body, and a compressible seal above the single serving brewing capsule for sealing with the adapter lid, according to the present invention.

FIG. 13A shows components of a capsule including a rounded filter paper cup according to the present invention.

FIG. 13B shows the completed capsule including the rounded filter paper cup according to the present invention.

FIG. 14A shows components of a capsule including a pointed filter paper cup according to the present invention.

FIG. 14B shows the completed capsule including the pointed filter paper cup according to the present invention.

FIG. 15A shows components of a capsule including a mesh cup according to the present invention.

FIG. 15B shows the completed capsule including the mesh cup according to the present invention.

DETAILED DESCRIPTION OF THE INVENTION

Figure 2A:
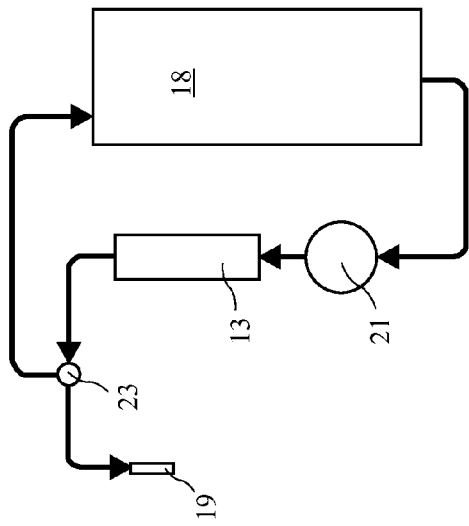
FIG. 2A is a functional diagram of the coffee maker.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A, a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, a platform 24 and a mouth 12a. A coffee mug 26 rests on the platform 24 inside the mouth 12a. The coffee maker 10 provides a flow of hot water through coffee grounds to produce a coffee drink. The flow of water may be heated by one of any known means, for example, an electrical heating coil or a conductive coating on tubing carrying the water.

Figure 16:
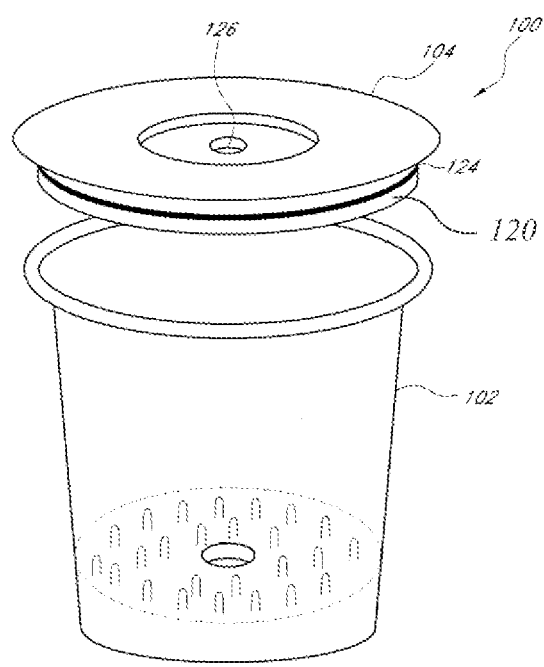

FIG. 16 shows a capsule having a lid including a cylindrical portion inserted into a base.

Figure 2:
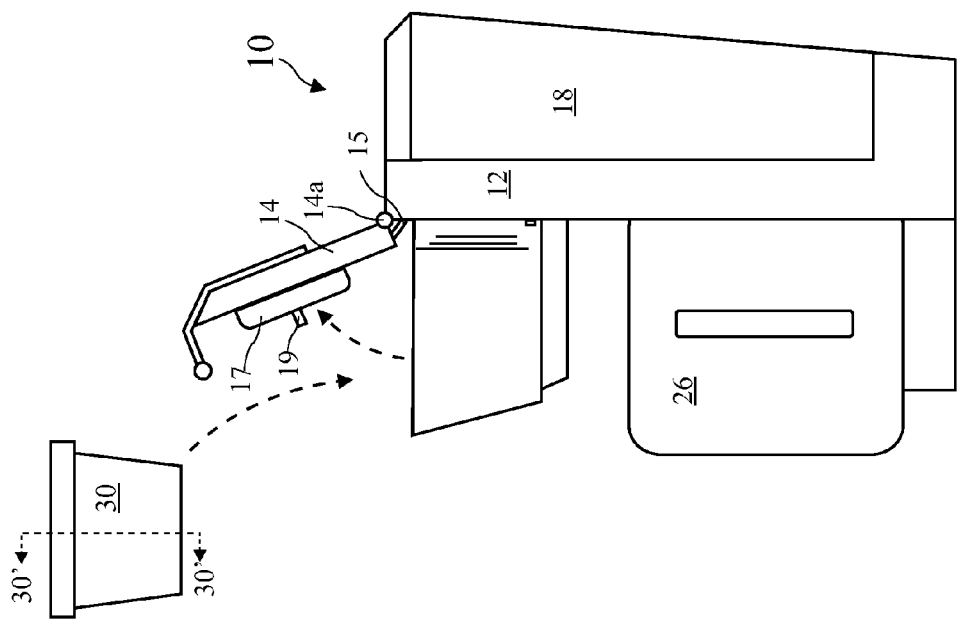
FIG. 2 is a side view of the coffee maker with an open lid allowing placement of an adapter containing a single serving filter paper cup according to the present invention inside the coffee maker.

A side view of the coffee maker 10 with an open coffee maker lid 14 allowing placement of a single serving brewing capsule 30 according to the present invention inside the coffee maker 10 is shown in FIG. 2. The coffee maker lid 14 includes a lid hinge 14a and a water tube 15 which carries heated water into the coffee maker lid 14. A pad 17 resides on a bottom surface of the coffee maker lid 14 and presses against the adapter 30 when the coffee maker lid 14 is closed, and in cooperation with other means discloses hereafter, tamps coffee contained in the adapter 30. A nozzle 19 extending down from the closed coffee maker lid 14 directs the flow of hot water into the adapter 30. The adapter 30 is reusable and comprises a receptacle, and a cover detachable and re-attachable to the receptacle to facilitate reuse. The cover includes graspable features to allow easy detachment and is preferably attached to the receptacle by an interference fit. Such an adapter is described in U.S. patent application Ser. No. 11/777,831, filed Jul. 13, 2007 for "Adapter System for Single Service Beverage Brewers" by the present applicant and incorporated by reference above.

A functional diagram of the coffee maker 10 is shown in FIG. 2A. The preferred coffee maker 10 includes the water tank 18, water pump 21, a heater 13, check valve 23 and the nozzle 18. The water pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While the water pump 21 is a preferred method for providing a flow of water to the nozzle 19, other methods include pressuring the water in the water tank 18, and a coffee maker using any means to provide a forced flow of water is intending to within the scope of the present invention.

A side view of a single serving filter paper cup 40 with a folding paper lid 40d open is shown in FIG. 3A, a top view of the single serving filter paper cup 40 is shown in FIG. 3B, a second side view of the single serving filter paper cup 40 with the folding paper lid 40d closed is shown in FIG. 3C, the cut, but not formed, single serving filter paper cup 40i is shown in FIG. 3D, and a cross-sectional view of the single serving filter paper cup 40 taken along line 4-4 of FIG. 3B is shown in FIG. 4. The single serving filter paper cup 40 comprises a receptacle 40f and cover 40d. The cover 40d of the single serving filter paper cup 40 may be folded over a rim 40c of the cup 40 and sealed after loose brewing material 41 (see FIG. 7A) is poured into the receptacle 40f. The receptacle 40f comprises a bottom (or floor) 40b, sides (or walls) 40a, and a rim (or annular rim) 40c. The sides 40a reach upward from the bottom 40b to an upper opening 40i. The rim 40c extends out from a top edge 40h of the receptacle 40f. The rim 40c is generally horizontal and preferably flat. The cover 40d contacts the rim 40c to close the receptacle 40f to capture brewing material 41 in the receptacle 40f. The cup 40 may be made from a single piece of material, or the cover 40d and receptacle 40f may be made from separate pieces of material glued together. The cover 40d may be constructed from filter paper, plastic, wax paper, or any material suitable for puncturing by needle attached to the coffee maker, and attachable to a receptacle 40f made of a material suitable for filtering a brewed liquid.

The single serving filter paper cup receptacle 40f is preferably formed from a flat circle of filter paper using heat and/or moisture to form permanent folds (or pleats) 40e in the sides 40a and rim 40c of the single serving filter paper cup 40 to add strength and rigidity to the single serving filter paper cup 40 so that the single serving filter paper cup 40 retains its shape after forming, and adhesive may be applied to the rim 40c and/or the sides 40a or is included in the manufacture of the filter paper, to retain the pleats and add strength and rigidity to the single serving filter paper cup 40. In one preferred embodiment, the single serving filter paper cup 40 is constructed from heat sealable filter paper having a heat activated adhesive on at least one side or permeating the filter paper forming at least one of the receptacle and the cover, which adhesive causes the pleats to adhere to adjacent pleats when heat is applied following forming. In another embodiment, no adhesive is used, and preferable, contact adhesive is absent on the filter paper. The pleats in the rim 40c are generally continuations of the pleats in the sides 40a. The single serving filter paper cup 40 may alternatively be corrugated to retain shape. The single serving filter paper cup 40 thus has structure for maintaining a substantially (i.e., within the ability of the paper to maintain a shape) frustoconical or cylindrical shape unlike known coffee pods which have no structure for maintaining shape and are pillow-like. U.S. patent application Ser. No. 11/392,893 filed Mar. 28, 2006 by the present inventor, discloses a similar single serving filter paper cup forming a coffee pod. The '893 application is incorporated by reference above.

The single serving filter paper cup 40 is preferable frusto-conical shaped or cylindrically shaped and more preferably frusto-conical shaped. The single serving filter paper cup 40 has a base diameter D1, an inner top diameter D2, an outer top diameter (the diameter of the rim 40c) D3, and a height H. The diameter D1 is preferably approximately 1.25 inches, the diameter D2 is preferably approximately 1.625 inches, the diameter D3 is preferably approximately 2.125 inches, and the height His preferably approximately one inch. The rim 40c is thus approximately 0.25 inches wide. The cover 40d preferably has approximately the same diameter D3 as the rim 40c, and more preferably has the same diameter D3 as the rim 40c.

The single serving filter paper cup 40 may be sold in an empty state for filling by a user, or as a pre-packaged single serving coffee capsule. When sold for filling by the user, the single serving filter paper cup 40 is preferably sold with the cover 40d attached to the rim 40c of the receptacle 40f. For example, an unformed single serving filter paper cup 40i may comprise a single serving filter paper cup receptacle 40f and cover 40d may be made from a single piece of filter paper cut into two circular portions 40f' and 40d' attached by a hinge 40g, or by two separately cut circles of filter paper attached at the hinge 40g. A single serving filter paper cup 40' may also be sold as two pieces as shown in FIG. 5A, where the cover 40d is detached from the receptacle 40f, but it may be slightly more difficult to align a detached cover 40d' with the rim 40c. Because of the material required for forming the single serving filter paper cup receptacle 40, the circular portions 40f is much larger than the circular portions 40d'. A single serving filter paper cup 40" may also be sold without a cover as shown in FIG. 5B.

A user may seal the cover 40d to the rim 40c of the receptacle 40f using a pod making system as disclosed in U.S. patent application Ser. No. 11/392,972 (incorporated by reference above) adapted to the shape of the single serving filter paper cup 40, or the cover 40d may be held to the receptacle 40f by sandwiching the cover and rim of the single serving filter paper cup 40 between an adapter lid 32a and adapter body 32b (see FIG. 7A). When the single serving filter paper cup 40 is sold as a single serving pre-packaged brewing material 50 (see FIG. 10A) containing brewing material 41, the single serving pre-packaged brewing material 50 (see FIG. 10A) is generally manufactured using filter paper off two separate rolls.

Figure 6A:
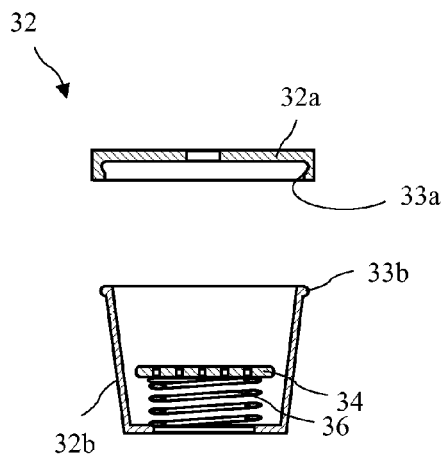
FIG. 6A is a cross-sectional side view of an adapter according to the present invention, taken along line 30'-30' of FIG. 2 with an adapter lid separated from an adapter body.
Figure 6C:
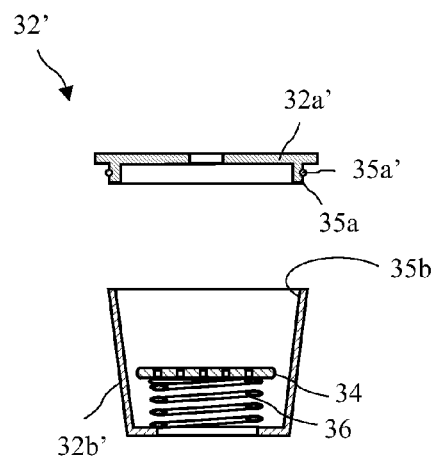
FIG. 6C is a cross-sectional side view of a second adapter according to the present invention, taken along line 30'-30' of FIG. 2 with a second adapter lid separated from the adapter body.
Figure 6B:
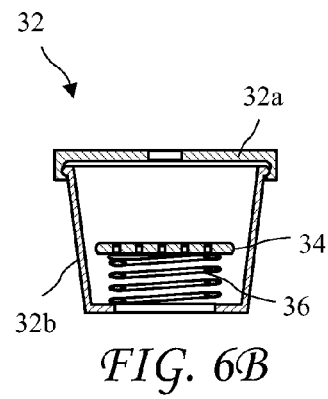
FIG. 6B is a cross-sectional side view of the adapter according to the present invention, taken along line 30'-30' of FIG. 2 with the adapter lid attached to the adapter body.

A cross-sectional side view of an adapter 32 according to the present invention, taken along line 30'-30' of FIG. 2, with an adapter lid 32a separated from an adapter body 32b is shown in FIG. 6A and a cross-sectional side view of the adapter 32, taken along line 30'-30' of FIG. 2 with the adapter lid 32a attached to the adapter body 32b is shown in FIG. 6B. The adapter 32 may have a frustoconical or a cylindrical shape, and the shape may be selected based on a coffee maker the adapter 32 is intended for use in. The adapter 32 has an adapter lid 32a and an adapter body 32b. The lid 32a includes a downward reaching lip 33a around the outside edge of the lid for engaging an outside ring 35b around the top edge of the base 32b for retaining the lid on the base. A tamping spring 36 and platform 34 may be included in the adapter base 32b. The tamping spring 36 preferably lifts the platform to at least the center of the base 32b, and more preferably lifts the platform 34 at least ¼ the height of the base 32, and most preferably lifts the platform 34 at about ¼ the height of the base 32. U.S. patent application Ser. No. 11/777,831 filed Jul. 13, 2007 filed by the present inventor, describes a similarly pod holder. The '831 application is incorporated by reference above.

Figure 6D:
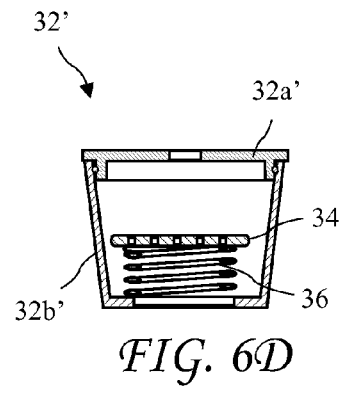
FIG. 6D is a cross-sectional side view of the second adapter according to the present invention, taken along line 30'-30' of FIG. 2 with the second adapter lid attached to the adapter body.

A cross-sectional side view of a second adapter 32' according to the present invention, taken along line 30'-30' of FIG. 2 with a second adapter lid 32a' separated from the adapter body 32b is shown in FIG. 6C and a cross-sectional side view of the second adapter 32', taken along line 30'-30' of FIG. 2 with the second adapter lid 32a' attached to the adapter body is shown in FIG. 6D. The adapter lid 32a' includes a short cylindrical ring 35a reaching downward near the outside edge of the lid 32a' for engaging an inside surface 35b near the upper edge of the base 32b' providing an interference fit to retain the lid on the base. The ring 35a may further include an O-Ring 35a' on the ring 35a outside surface to further retain the lid on the base.

A cross-sectional side view of a single serving brewing capsule 42, taken along line 30'-30' of FIG. 2, showing a portion of coffee 41 above the single serving filter paper cup 40 and the adapter body 32b, and the adapter lid 32a above the portion of coffee 41, according to the present invention is shown in FIG. 7A. A cross-sectional side view of the single serving brewing capsule 42, taken along line 30'-30' of FIG. 2, showing the portion of coffee 41 in the single serving filter paper cup receptacle 40g resting in the adapter base 32b, and the adapter lid 32a above the portion of coffee 41, is shown in FIG. 7B. A cross-sectional side view of the single serving brewing capsule 42, taken along line 30'-30' of FIG. 2, showing the portion of coffee 41 in the single serving filter paper cup receptacle 40f, the attached cover 40d folded over the portion of coffee 41, and the adapter lid 32a above the attached cover 40d, is shown in FIG. 7C. A cross-sectional side view of the single serving brewing capsule 42, taken along line 30'-30' of FIG. 2, showing the portion of coffee 41 in the single serving filter paper cup 40 in the adapter body 32b, and the rim 40c of the single serving filter paper cup receptacle 40f and outer edge of the single serving filter paper cup cover 40d sandwiched between the adapter lid 32a and adapter body 32b, is shown in FIG. 7D. Capturing the rim 40c holds the single serving filter paper cup 40 against the lid 32a, thus reducing or preventing channeling of heated water injected into the single serving brewing capsule 42 and prevents or restricts the escape of the brewing material 41 from the filter paper cup 40 during brewing. Further, capturing the outer edge of the single serving filter paper cup cover 40d holds the cover 40d taught facilitating the penetration of the cover 40d by a needle for injecting the hot water into the single serving filter paper cup 40. The brewing material 41 is preferably retained in the filter paper cup 40 solely by attaching the lid 32a of the adapter 32 to the base 33b of the adapter 32 to sandwich the rim 40c of the filter paper cup 40 and the outer edge of the cover 40d between the lid and base of the adapter.

A cross-sectional side view of a single serving brewing capsule 42' taken along line 30'-30' of FIG. 2, showing the portion of coffee 41 above the single serving filter paper cup receptacle and the adapter body 40f, the detached cover 40d' above the portion of coffee 41, and the adapter lid 32a above the detached cover 40d', according to the present invention, is shown in FIG. 8A, a cross-sectional side view of the single serving brewing capsule 42', taken along line 30'-30' of FIG. 2, showing the portion of coffee 41 in the single serving filter paper cup receptacle 40f, the detached cover 40d' above the portion of coffee 41, and the adapter lid 32a above the detached cover 40d', is shown in FIG. 8B, a cross-sectional side view of the single serving brewing capsule 42', taken along line 30'-30' of FIG. 2, showing the portion of coffee 41 in the single serving filter paper cup receptacle 40f, the detached cover 40d' resting on the portion of coffee 41 and the single serving filter paper cup receptacle 40f, and the adapter lid 32a above the single serving filter paper cup receptacle 40f, is shown in FIG. 8C, and a cross-sectional side view of the single serving brewing capsule 42', taken along line 30'-30' of FIG. 2, showing the portion of coffee 41 in the single serving filter paper cup 40 in the adapter body 32b, and the rim 40c of the single serving filter paper cup receptacle 40f and outer edge of the detached cover 40d' sandwiched between the adapter lid 32a and adapter body 32b, is shown in FIG. 8D. Other than replacing the attached cover 40d with the detached cover 40d', the single serving brewing capsule 42' includes the features of the single serving brewing capsule 42 described above.

A cross-sectional side view of a single serving brewing capsule 42", taken along line 30'-30' of FIG. 2, showing the portion of coffee 41 above the single serving filter paper cup receptacle 40f and the adapter body 32b, and a second adapter lid 32a' above the portion of coffee 41, according to the present invention, is shown in FIG. 9A, a cross-sectional side view of the single serving brewing capsule 42", taken along line 30'-30' of FIG. 2, showing the portion of coffee 41 in the single serving filter paper cup receptacle 40f, and the adapter lid 32a' above the portion of coffee 41, is shown in FIG. 9B, and a cross-sectional side view of the single serving brewing capsule 42", taken along line 30'-30' of FIG. 2, showing the portion of coffee 41 in the single serving filter paper cup receptacle 40f in the adapter body 32b, and the rim 40c of the single serving filter paper cup receptacle 40f sandwiched between the adapter lid 32a' and adapter body 32b, is shown in FIG. 9C. The lid 32a' may include a seal 44 on a top surface of the lid 32a'. Because the single serving filter paper cup does not include a cover, the needle 19 (see FIG. 2) merely enters the adapter 32 and does not puncture a cover, and in another embodiment, a jet of heated water is injected into the brewing material 41 with using the needle 19. As a result, a seal is not formed between the needle 19 and the cover 40d, and in some applications (e.g., some coffee makers) a water leak or loss of brewing material 41 may occur between the pad 17 (see FIG. 2) and the adapter 32. With or without the needle 19, the seal 44 presses against the pad 17 preventing or reducing such leaking. The seal 44 may be a portion of a plastic lid 32a', or a separate seal attached to the lid 32a', for example a rubber washer or O-Ring held against the cover. Other than the absence of the cover and the potential addition of the seal 44', the single serving brewing capsule 42" includes the features of the single serving brewing capsule 42 described above.

A cross-sectional side view of a single serving brewing capsule 42''', taken along line 30'-30' of FIG. 2, showing the portion of coffee 41 in the single serving filter paper cup receptacle in the adapter body 32b, and the rim of the single serving filter paper cup receptacle 40c sandwiched between the adapter lid 32a" and the adapter body, and a compressible seal 48 is attached to the bottom of the pad 17 above the single serving brewing capsule 42" for better sealing with the adapter lid is shown in FIG. 9D. The lid 32a" may include a recessed area 45 for cooperation with the compressible seal 48 providing a better seal than a flat lid. Other than the lid 32a" having the recessed area 45, the single serving brewing capsule 42''' includes the features of the single serving brewing capsule 42 described above.

Figure 10A:
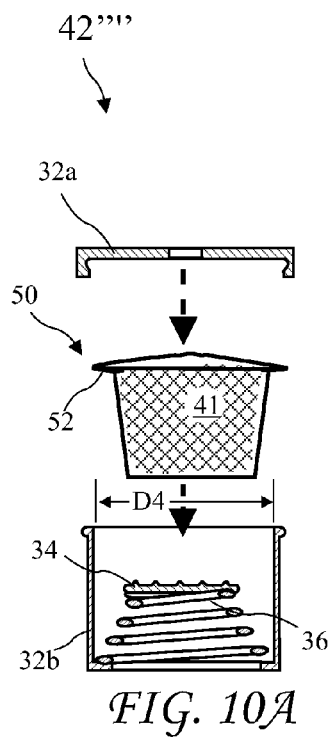
FIG. 10A is a cross-sectional side view of a single serving brewing capsule, taken along line 30'-30' of FIG. 2, showing a single serving pre-packaged brewing material above the adapter body, and the adapter lid above the single serving pre-packaged brewing material according to the present invention.
Figure 10B:
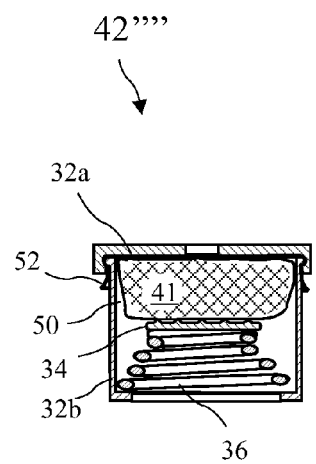
FIG. 10B is a cross-sectional side view of the single serving brewing capsule, taken along line 30'-30' of FIG. 2, showing the single serving pre-packaged brewing material in the adapter body, and the rim of the single serving pre-packaged brewing material sandwiched between the adapter lid and adapter body, according to the present invention.

A cross-sectional side view of a single serving brewing capsule 42", taken along line 30'-30' of FIG. 2, showing a single serving pre-packaged brewing material 50 above the adapter body 32b, and the adapter lid 32a above the single serving pre-packaged brewing material 50 according to the present invention is shown in FIG. 10A and a cross-sectional side view of the single serving brewing capsule 42", taken along line 30'-30' of FIG. 2, showing the single serving pre-packaged brewing material 50 in the adapter body 32a, and the rim 52 of the single serving pre-packaged brewing material 50 sandwiched between the adapter lid 32a and adapter body 32b is shown in FIG. 10B. Other than the use of the single serving pre-packaged brewing material 50, the single serving brewing capsule 42" includes the features of the single serving brewing capsule 42 described above.

Figures 11A, 11B, 11C:
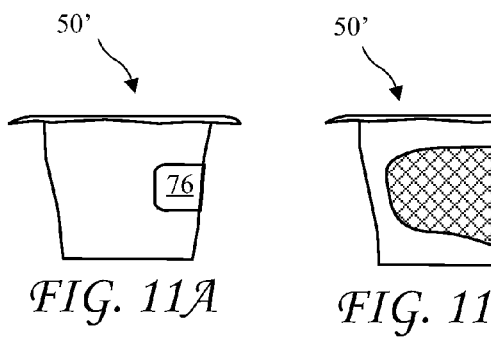
FIG. 11A shows a single serving pre-packaged brewing material having a bar code for use in the coffee maker according to the present invention.
FIG. 11B shows a cut away view of the single serving pre-packaged brewing material for use in the coffee maker according to the present invention showing the brewing material.
FIG. 11C shows the single serving pre-packaged brewing material in an adapter having a window to expose the bar code according to the present invention.

A single serving pre-packaged brewing material 50' having a indentifier 76 for use in the coffee maker 10 according to the present invention is shown in FIG. 11A, a cut away view of the single serving pre-packaged brewing material 50' showing the brewing material 41 is shown in FIG. 11B, and the single serving pre-packaged brewing material 50' in a third adapter 32" having a window 77 to expose the indentifier 76 is shown in FIG. 11C. The indentifier 76 allows the coffee maker 10 to select a desired water temperature and brewing time (e.g., water injection rate) for the particular coffee 41 in the single serving pre-packaged brewing material 50. The single serving pre-packaged brewing material 50 includes the rim 52 for capturing between the lid and base of the adapter 32". The adapter 32" may include any of the features of the adapters 32 and 32' described above.

Figure 12A:
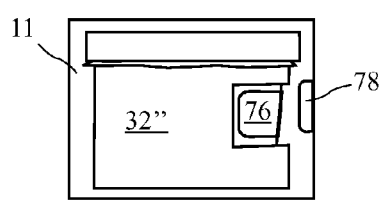
FIG. 12A shows the single serving pre-packaged brewing material residing in the adapter with the identification feature cooperating with a sensor residing in or near the cavity of the coffee maker according to the present invention.
Figure 12B:
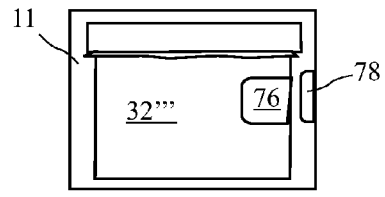
FIG. 12B shows a fourth adapter having the identification feature affixed to the adapter with the identification feature cooperating with the sensor residing in or near the cavity of the coffee maker according to the present invention.

The single serving pre-packaged brewing material 50' is shown residing in the adapter 32" in FIG. 12A with the identifier 76 cooperating with a sensor 78 residing in or near the cavity 11 of the coffee maker 10, and a fourth adapter 32''' having the identifier 76 affixed to the adapter 32''' is shown in FIG. 12B with the identifier 76 cooperating with the sensor 78 residing in or near the cavity 11 of the coffee maker. The window 77 provides visual cooperation between the identifier 76 and sensor 78 when necessary.

The identifier 76 may be visual (for example any feature which may be read, e.g., a bar code, a UPC, or the like), a readable magnetic strip, a Radio Frequency Identification (RFID), or any feature able to contain information and provide that information to a reader. The identifier 76 may be read by a sensor 78 appropriately positioned in the cavity 11 of the coffee maker. The indentifier 76 may be on any surface of the pre-packaged brewing material 41a and in the instance of a visual identifier 76, the window 77 may be positioned on the adapter 30p and the sensor may be positioned in the cavity 11 to correspond with the position of the visual identifier 76. A window 77 is generally not required for a magnetic or RF identifier 76 and the location of the corresponding sensor 78 generally only need be sufficiently near to the indentifier 76.

In another embodiment, a sensor 78 resides on the exterior of the coffee maker. A bulk brewing material container, a pre packaged pod, an adapter, a recipe book, or any apparatus carrying an indentifier, may be swept past the sensor or held against or near the sensor, to provide brewing information to the coffee maker.

Components of a single serving capsule 42""' including a rounded filter paper cup 40j according to the present invention are shown in FIG. 13A and the completed capsule 42""' is shown in FIG. 13B. The rounded filter paper cup 40j may be used with or without the platform 34 and spring 36. The rounded filter paper cup 40j includes the rim 40c for capture between the lid and base of the adapter.

Components of a single serving capsule 42""' including a pointed filter paper cup 40k according to the present invention are shown in FIG. 14A and the completed capsule 42""' is shown in FIG. 14B. The pointed filter paper cup 40k may be used with or without the platform 34 and spring 36, but is preferably used without the platform 34 and spring 36. The pointed filter paper cup 40k includes the rim 40c for capture between the lid and base of the adapter.

Components of a single serving capsule 42""' including a mesh cup 40j according to the present invention are shown in FIG. 15A and the completed capsule 42""' is shown in FIG. 15B. The mesh cup 40j may include a metal mech, plastic mesh, or other mesh material suitable for preventing the escape of brewing material during brewing. A rim 40c' around the top of the mesh cup 40l is captured between the lid and base of the adapter to hold the mesh cup 40l during brewing. The rim 40c' is preferable a rubber, plastic, flexible metal, or any material suitable for capturing between the adapter lid and base. The mesh cup 40l may be used with or without the platform 34 and spring 36, but is preferably used without platform 34 and spring 36.

A filter paper cup has been described above. In many instances, a single serving filter cup made of nylon mesh or metal mesh, or any suitable mesh material is equally suitable, and any combination of filter cup and adapter including a rim on the filter cup captured between a lid and body of the adapter is intended to come within the scope of the present invention regardless of the specific filter material. Further, those skilled in the art will recognize that the features of the various embodiments of the present invention disclosed herein may be combined to provide various combinations. All of such combinations are intended to come within the scope of the present invention.

While the invention herein disclosed has been described by means of specific embodiments and applications thereof, numerous modifications and variations could be made thereto by those skilled in the art without departing from the scope of the invention set forth in the claims.

A capsule having a lid 100 including a rim 104 and a cylindrical portion 120 inserted into a base 102 is shown in FIG. 16. An O-ring 124 resides on the cylindrical portion 120.

I claim:

1. A method of assembling a single serving beverage brewing capsule, the method comprising:
    manufacturing a filter paper cup comprising the steps of:
        providing water permeable material;
        cutting a greater diameter flat circular lower portion from the water permeable material;
        shaping the lower portion to form a floor and walls creating a downward concave cup shaped receptacle to receive and hold a single serving of brewing material;
        forming a generally flat annular rim of the lower portion, surrounding an upward opening of the receptacle
    inserting the filter paper cup into a reusable adapter body;
    placing a single serving of brewing material into the filter paper cup;
    capturing the annular rim between a reusable adapter lid and the reusable adapter body; and
    completing assembling the single serving beverage brewing capsule outside and independent of a coffee maker.

2. The method of claim 1, wherein shaping the lower portion to form the receptacle and rim comprises creating folds in the lower portion to create pleated walls and a pleated annular rim.

3. The method of claim 2, wherein shaping the lower portion to form the receptacle and rim comprises heating and shaping the lower portion to create the folds in the lower portion to create pleated walls and a pleated annular rim.

4. The method of claim 3, wherein shaping the lower portion to form the receptacle and rim comprises heating and shaping the lower portion made from heat sealable filter paper to create the folds in the lower portion to create pleated walls and a pleated annular rim and to adhere adjacent layers of the folds to each other to better retain the shape of the receptacle and rim.

5. The method of claim 1, wherein:
    cutting a greater diameter flat circular lower portion comprises cutting the greater diameter flat circular lower portion and a cover comprising a smaller diameter flat circular upper portion, hingedly connected to each other by a hinge, from a single piece of the water permeable material,
    and further including, after placing a single serving of brewing material into the filter paper cup:
        folding the cover over the lower portion, and
        capturing the annular rim comprises capturing the annular rim and outside edge of the cover between an adapter lid and the adapter body; and
        holding the cover taut to facilitate puncturing the cover for injecting heated water into the filter paper cup.

6. The method of claim 5, wherein attaching the adapter lid to the adapter body using features of the adapter lid and adapter body to sandwich the annular rim of the receptacle and the outer edge of the cover between the adapter lid and the adapter body is the sole method of sealing the filter paper cup.

7. The method of claim 6, wherein attaching the adapter lid to the adapter body using features of the adapter lid and adapter body to sandwich the annular rim of the receptacle and the outer edge of the cover between the adapter lid and the adapter body is the sole method of retaining the brewing material in the filter paper cup.

8. The method of claim 5, wherein:
the adapter base includes a spring and platform reaching at least half of the distance from the bottom of the adapter body into the adapter in the absence of the rimmed single serving beverage brewing cup in the adapter; and
the spring and platform push the rimmed single serving beverage brewing cup residing in the adapter body upward against the adapter lid to tamp the brewing material.

9. A method of assembling a single serving beverage brewing capsule, the method comprising:
obtaining a filter paper cup comprising:
a concave receptacle formed from a flat circle of heat sealable filter paper, the receptacle shaped to receive and hold a single serving of brewing material, the receptacle comprising:
a floor;
pleated walls reaching upward from the floor to an upper opening, first pleats of the pleated walls are a product of forming the receptacle from the flat circle of heat sealable filter paper, the first pleats adhered to adjacent ones of the first pleats by adhesive in the heat sealable filter paper; and
an outward reaching pleated rim at the upward opening of the walls, second pleats of the pleated rim a product of forming the rim from the flat circle of the heat sealable filter paper, the second pleats adhered to adjacent ones of the second pleats by the adhesive in the heat sealable filter paper;
inserting the filter paper cup into a reusable adapter body, the adapter body comprising:
a flat base; and
walls rising from the base;
placing a single serving of brewing material into the filter paper cup; and
capturing the annular rim of the concave receptacle between a reusable adapter lid and the adapter body, the adapter lid comprising:
a flat top;
a passage for injection of liquid into the adapter body; and
a downward reaching cylindrical edge;
advancing the downward reaching cylindrical edge of the adapter lid into the adapter body; and
engaging the downward reaching cylindrical edge of the adapter lid with the adapter body to attached the adapter lid to the adapter body to form the single serving beverage brewing capsule outside and independent of a coffee maker.

10. A method of assembling a single serving beverage brewing capsule, the method comprising:
obtaining a filter paper cup comprising:
a concave receptacle made from water permeable material shaped to receive and hold a single serving of brewing material, the receptacle comprising:
a floor;
walls reaching upward from the floor to an upper opening; and
a rim at an upward opening of the walls;
obtaining an adapter comprising:
an adapter body; and
an adapter lid attachable to the adapter body by cooperation of features of the adapter lid with features of the adapter body;
inserting the filter paper cup into the adapter body;
placing a single serving of brewing material into the filter paper cup; and
attaching the adapter lid to the adapter body, including capturing the annular rim between the adapter lid and the adapter body to assemble the single serving beverage brewing capsule outside and independent of a coffee maker.

11. The method of claim 10, wherein obtaining a filter paper cup comprises obtaining the filter paper cup including a cover having about the same perimeter as the rim, and the method further includes:
after placing a single serving of brewing material into the filter paper cup, folding the cover over the filter paper cup; and
capturing the annular rim between the adapter lid and the adapter body comprises capturing the annular rim and outside edge of the cover between the adapter lid and the adapter body.

12. The method of claim 11, wherein obtaining a filter paper cup comprises obtaining the filter paper cup wherein:
the rim is a generally flat annular rim circling the upper opening of the walls;
the cover is a flat cover hingedly attached to the annular rim; and
the cover has a diameter approximately the same as the annular rim.

13. The method of claim 12, wherein obtaining a filter paper cup comprises obtaining the filter paper cup wherein the receptacle and the cover are a continuous single piece of filter material.

14. The method of claim 13, wherein obtaining a filter paper cup comprises obtaining the filter paper cup, wherein:
the receptacle and the cover are made of water permeable material;
in a preformed state, the material comprising:
a smaller diameter first portion for forming the flat cover; and
a larger diameter second portion for forming the floor, walls, and rim of the receptacle;
the formed receptacle including folds in the walls and the annular rim resulting from forming the receptacle from the larger diameter second portion.

15. The method of claim 14, wherein obtaining a filter paper cup comprises obtaining the filter paper cup, wherein:
the water permeable material is a heat sealable filter paper; and
overlapping portions of the folds in the walls and annular rims are attached by heat activated adhesive in the heat sealable filter paper.

16. The method of claim 12, wherein obtaining a filter paper cup comprises obtaining the filter paper cup, wherein the receptacle and the cover are separately cut from filter paper and hingedly attached prior to filling the receptacle with brewing material.

17. The method of claim 12, wherein obtaining a filter paper cup comprises obtaining the filter paper cup, wherein the annular rim of the receptacle includes pleats created during forming the annular rim from flat filter material.

18. The method of claim 10, wherein obtaining a filter paper cup comprises obtaining the filter paper cup, wherein the walls of the receptacle are substantially vertical walls including pleats created during forming the receptacle from flat filter material.

19. The method of claim 10, wherein obtaining a filter paper cup comprises obtaining the filter paper cup, wherein the walls of the receptacle form a frusto-conical surface including pleats created during forming the receptacle from flat filter material.

20. The method of claim 5, wherein the greater diameter flat circular lower portion and the smaller diameter flat circular upper portion are formed from a single continious piece of the water permeable material.

21. The method of claim 20, wherein the greater diameter flat circular lower portion and the smaller diameter flat circular upper portion comprise two intersecting generally circular portions of water permeable material.

22. The method of claim 5, wherein the greater diameter flat circular lower portion and the smaller diameter flat circular upper portion are joined to form a single piece of the water permeable material comprising two intersecting generally circular portions of water permeable material.

* * * * *